(12) United States Patent
Nesset et al.

(10) Patent No.: US 7,336,906 B2
(45) Date of Patent: Feb. 26, 2008

(54) OPTICAL SIGNAL TRANSMISSION

(75) Inventors: Derek Nesset, Little Kineton (GB); Steven Alleston, Leamington Spa (GB); Paul Harper, Leamington Spa (GB); Benoit Charbonnier, Bicester (GB)

(73) Assignee: Ericsson AB, Stockholm (SE)

(*) Notice: Subject to any disclaimer, the term of this patent is extended or adjusted under 35 U.S.C. 154(b) by 519 days.

(21) Appl. No.: 10/491,400

(22) PCT Filed: Sep. 11, 2002
(Under 37 CFR 1.47)

(86) PCT No.: PCT/GB02/04125
§ 371 (c)(1),
(2), (4) Date: Feb. 18, 2005

(87) PCT Pub. No.: WO03/032532
PCT Pub. Date: Apr. 17, 2003

(65) Prior Publication Data
US 2005/0226638 A1   Oct. 13, 2005

(30) Foreign Application Priority Data
Oct. 9, 2001  (GB) .............................. 0124234.6

(51) Int. Cl.
*H04B 10/00* (2006.01)
(52) U.S. Cl. .................. 398/195; 398/198; 398/162
(58) Field of Classification Search ........ 398/195–198, 398/162
See application file for complete search history.

(56) References Cited

U.S. PATENT DOCUMENTS
5,382,920 A    1/1995  Jung
(Continued)

FOREIGN PATENT DOCUMENTS
DE    195 31 761 C1    8/1995
(Continued)

*Primary Examiner*—Agustin Bello
(74) *Attorney, Agent, or Firm*—Kirschstein, et al

(57) ABSTRACT

An optical signal transmission apparatus for transmitting a plurality of data signals comprising a plurality of inputs for receiving a respective one of the data signals and delivering the respective data signal with a controlled phase and at a controlled data rate. A plurality of optical carrier signals having different wavelength is generated. Each of a plurality of first modulators is operative for modulating a respective one of the optical carriers with a respective data signal to provide a first-modulated optical carrier signal. An optical signal-routing device has a plurality of input ports, each port being for receiving a respective one of the first-modulated optical carrier signals and delivering it to the output port of the device. The apparatus further comprises further modulators for further modulating each of the first-modulated optical carrier signals in dependence upon a clock to provide a plurality of further-modulated optical carrier signals; and a feedback arrangement, including the optical signal-routing device, for feeding back a proportion of each of the further modulated optical carrier signals to a respective input for controlling the phase and rates at which the input delivers the data signal to the first modulator in dependence upon the further modulation to thereby synchronize each input data signal to the clock. The optical signal-routing device delivers each of the further-modulated signals applied to its output to a respective input along a path which is dependent upon the wavelength of the signal.

12 Claims, 1 Drawing Sheet

U.S. PATENT DOCUMENTS

| | | | |
|---|---|---|---|
| 5,726,789 A * | 3/1998 | Horiuchi et al. | 398/191 |
| 5,771,255 A * | 6/1998 | Horiuchi et al. | 372/31 |
| 5,859,718 A | 1/1999 | Yamamoto et al. | |
| 5,917,633 A * | 6/1999 | Gambini et al. | 398/32 |
| 5,926,297 A * | 7/1999 | Ishikawa et al. | 398/43 |
| 5,946,119 A | 8/1999 | Bergano et al. | |
| 6,445,478 B2 * | 9/2002 | Shimizu et al. | 398/192 |
| 6,532,099 B2 * | 3/2003 | Fuse | 359/278 |
| 6,671,079 B2 * | 12/2003 | Fuller et al. | 359/264 |
| 7,068,950 B2 * | 6/2006 | Sinsky | 398/198 |
| 7,079,772 B2 * | 7/2006 | Graves et al. | 398/95 |
| 7,085,500 B2 * | 8/2006 | Spickermann | 398/185 |
| 7,142,787 B2 * | 11/2006 | Horiuchi et al. | 398/154 |
| 7,200,344 B1 * | 4/2007 | Hoshida | 398/202 |
| 7,209,669 B2 * | 4/2007 | Kang et al. | 398/195 |
| 7,224,906 B2 * | 5/2007 | Cho et al. | 398/183 |
| 2001/0030791 A1 * | 10/2001 | Taneda | 359/181 |
| 2002/0191260 A1 * | 12/2002 | Bergano | 359/181 |

FOREIGN PATENT DOCUMENTS

| | | |
|---|---|---|
| EP | 0 792 033 A2 | 8/1997 |
| EP | 0 841 768 A2 | 5/1998 |
| JP | 7-30520 | 1/1995 |
| WO | WO 99/21316 | 4/1999 |
| WO | WO 01/22627 A1 | 3/2001 |

* cited by examiner

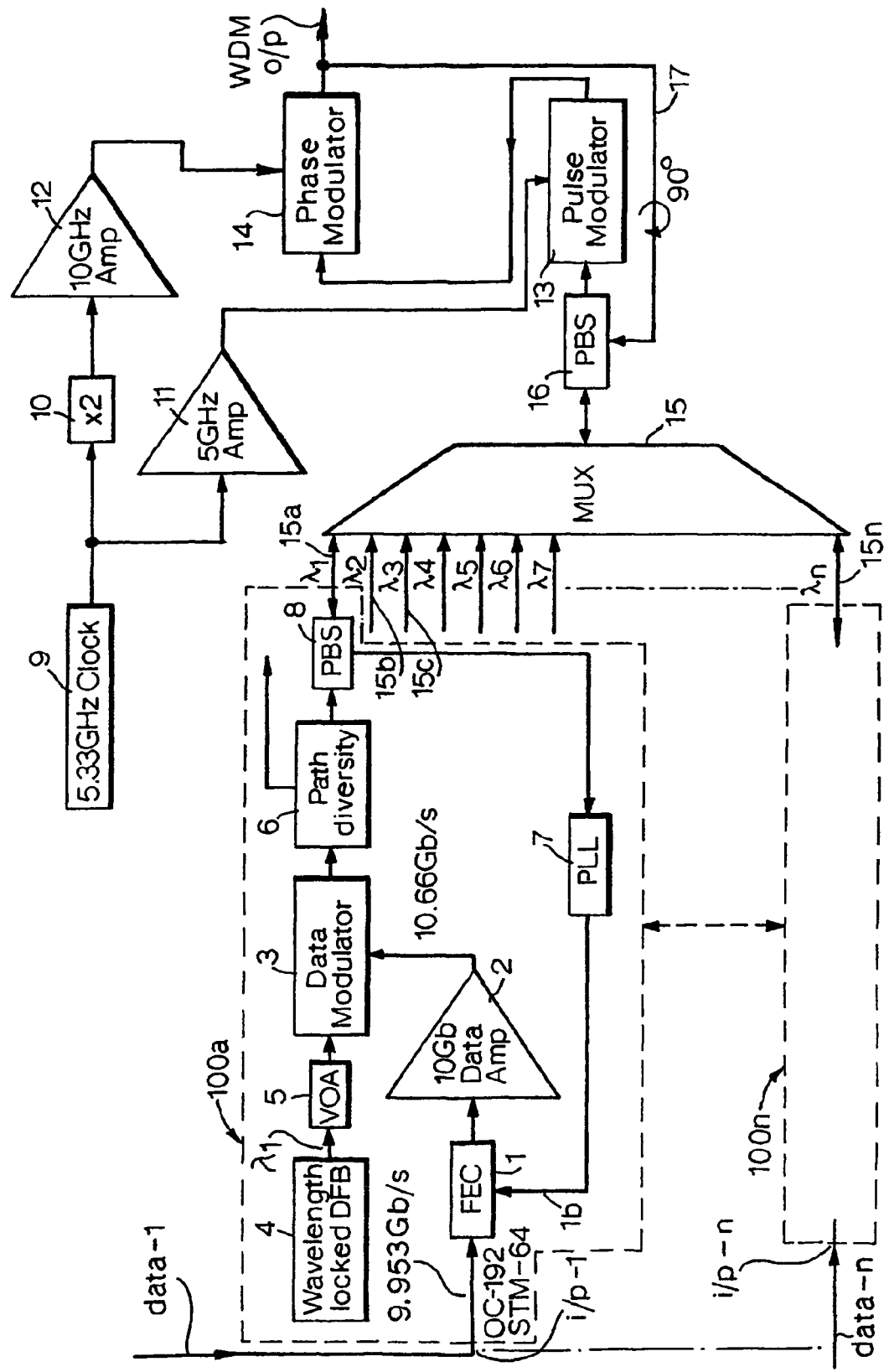

OPTICAL SIGNAL TRANSMISSION

This invention relates to optical signal transmission and more especially to an apparatus for, and a method of, transmitting a plurality of data signals (communication channels). In particular the invention concerns optical signal transmission for use in dense wavelength division multiplex (DWDM) optical telecommunication networks.

As is known in DWDM optical telecommunication networks a plurality (typically 40, 80, 160 or higher) of communication channels are transmitted by modulating a respective optical carrier having a discrete waveband, and then transmitting the plurality of modulated optical carriers (WDM radiation) along a single optical fibre. Typically each modulated optical carrier is generated by amplitude (intensity) modulating a continuous wave (cw) optical carrier generated by a respective laser using a respective optical modulator (e.g. a Mach-Zehnder optical modulator). It is also known to include a further respective optical modulator/s for modulating (e.g. phase modulation or pulse shaping) each of the modulated carriers before combining (multiplexing) them to form the WDM radiation for transmission. The control of such transmission apparatus is complex due to the large number of optical modulators involved especially for networks involving 80 or more channels. Additionally they are expensive due to the large number of modulators.

The present invention has arisen in an endeavour to provide an improved optical transmission apparatus that, at least in part, overcomes the limitations of the known arrangements.

According to the present invention there is provided an optical signal transmission apparatus for transmitting a plurality of data signals comprising: a plurality of input means for receiving a respective one of the data signals and delivering the respective data signal with a controlled phase and at a controlled data rate; optical carrier generation means for generating a plurality of optical carrier signals having different wavelengths; a plurality of first modulation means each being for modulating a respective one of the optical carriers with a respective data signal to provide a first-modulated optical carrier signal; and an optical signal-routing device having a plurality of input ports, each port being for receiving a respective one of the first-modulated optical carrier signals and delivering it to the output port of the device, characterised by: further modulation means for further modulating each of the first-modulated optical carrier signals in dependence upon a clock to provide a plurality of further-modulated optical carrier signals; and a feedback arrangement, including the optical signal-routing device, for feeding back a proportion of each of the further-modulated optical carrier signals to a respective input means for controlling the phase and rates at which the input means delivers the data signal to the first modulation means in dependence upon the further modulation to thereby synchronise each input data signal to the clock and wherein the optical signal-routing device delivers each of the further-modulated signals applied to its output to a respective input means along a path which is dependent upon the wavelength of the signal.

The present invention provides the advantage that each to of the data signals can be synchronised with a minimum of additional components; namely a single further optical modulator and the optical signal-routing device to provide a respective feedback path to each input means. Synchronisation of each data signal is advantageous in that it enables modulation to occur in the centre bit window for each data signal thereby enabling a single further modulator to be used to pulse shape all of the modulated carriers. In contrast in the known transmission apparatus a further respective modulator is used to pulse shape a respective one of the plurality of modulated optical carriers.

Preferably, the apparatus further comprises: a plurality of first optical directional couplers so connected as to convey the plurality of first-modulated optical carrier signals to the input ports of the optical signal-routing device and to convey the signals conveyed by the feedback arrangement from the input ports of the optical signal-routing device towards the plurality of input means and a second optical directional coupler so connected as to convey the plurality of first-modulated carrier signals from the output port of the optical signal-routing device and to convey the signals conveyed by the feedback arrangement to the output port of the optical signal-routing device.

Conveniently the optical directional couplers are polarisation dependent couplers that operate as beam-splitting devices in one direction and beam-combining devices in the opposite direction. With such couplers the apparatus advantageously further comprises: means, in a feedback path between the further modulation means and the second optical directional coupler, for providing a 90° rotation in the polarisation of signals conveyed by the path. Preferably such a feedback path comprises a polarisation maintaining optical fibre into which a 90° twist has been introduced.

Alternatively the first and second optical directional couplers can be optical circulators, in which case the feedback path need not provide a 90° rotation in the polarisation of signals conveyed by the feedback path.

Preferably, the optical signal-routing device comprises an arrayed waveguide router.

In one arrangement, the further modulation means comprises a pulse-shaping modulator.

In an alternative arrangement, the further modulation means comprises a phase modulator.

In a further alternative arrangement, the further modulation means comprises a pulse-shaping modulator connected in series with a phase modulator.

Preferably, the input means includes a buffer store capable of storing input signal data and delivering the signal data at the controlled rate.

The invention also provides a method of transmitting a plurality of data signals comprising: delivering the plurality of data signals with controlled phase at controlled rates; modulating a plurality of different-wavelength optical carrier signals with the data signals; conveying the plurality of different-wavelength modulated optical carrier signals to respective input ports of an optical signal-routing device, passing the plurality of different-wavelength modulated optical carrier signals through the optical signal-routing device which delivers the modulated optical carrier signals to its output port along respective paths through the optical signal-routing device dependent on the wavelengths of the optical carrier signals; subjecting the different-wavelength modulated optical carrier signals to further modulation at a set rate; transmitting the different-wavelength modulated optical carrier signals following the further modulation; and controlling the phase and rate of delivery of the plurality data signal sin accordance with the phase and rate of further modulation.

BRIEF DESCRIPTION OF THE DRAWING

An optical signal transmision apparatus in accordance with the invention will now be described by way of example only with reference to the accompanying drawing which is a diagrammatic representation of a WDM (Wavelength Division Multiplexing) optical signal transmission apparatus or transmitting a plurality of electrical data signals to produce a corresponding WDM optical output radiation.

Referring to the accompanying drawing, the WDM optical signal transmission apparatus comprises a plurality n of data input ports i/p-1 to i/p-n for receiving a respective electrical data input signal data-1 to data-n. Each data input i/p-1 to i/p-n is associated with a respective first-modulation circuit block 100a to 100n.

The components and interconnections of the first-modulation circuit block 100a associated with the input signal data-1 will now be described.

The data input port i/p-1 is provided by a signal input port of a forward error correction (FEC) circuit 1 which has a control input port 1b through which the FEC circuit 1 is synchronised to an external control signal/clock. The output port of the FEC circuit 1 is connected to the signal input port of an amplifier 2. The output port of the amplifier 2 is connected to a modulating-signal input port of an optical modulator 3 (e.g. Mach-Zehnder optical modulator) which includes an optical carrier-signal input port connected to a wavelength-locked distributed feedback laser (DFB) 4 through a variable optical attenuator (VOA) 5. The output port of the optical modulator 3 is connected to a signal input port of a path diversity control circuit 6 and the output port of the path diversity control circuit 6 is connected to a first port of a first polarisation beam splitter/combiner (PBS) 8. The PBS 8 includes a first output port which constitutes an optical output of the first-modulation circuit block 100a and a second output port which is connected through a phase locked loop (PLL) element 7 to the control input port 1b of the FEC 1.

The optical output of each first-modulation circuit block is connected to a respective input port 15a to 15n of an optical multiplexer 15. The output port of the optical multiplexer 15 is connected to a first port of a second polarisation beam splitter/combiner (PBS) 16, a second port of which is connected to a signal input port of an optical pulse-shaping modulator 13. The optical signal output port of the pulse-shaping modulator 13 is connected to a signal input port of an optical phase modulator 14, the output port of which serves as the output port of the transmission apparatus. The output port of a control clock oscillator 9 is connected through an amplifier 11 to an electrical control port of the pulse-shaping modulator 13. The output port of the control clock oscillator 9 is connected also to the control port of the phase modulator 14 through a frequency-doubling circuit 10 and an amplifier 12. An optical feedback path 17 extends from the output port of the phase modulator 14 to a third port of the second PBS 16. The optical feedback path 17 introduces a 90° rotation in the plane of polarisation of an optical signal passing through the path. Preferably the feedback path 17 comprises a polarisation maintaining optical fibre into which a 90° twist has been introduced.

As described the optical multiplexer 15 has a plurality of signal input ports 15a, 15b, 15c . . . 15n each associated with a respective first-modulator circuit block 100a, 100b . . . 100n. The multiplexer 15 passively combines (multiplexes) the plurality of optical input signals of different wavelengths applied to the signal input ports 15a, 15b, 15c . . . 15n and delivers the combined WDM signal to its single output port. Conversely, an optical signal applied to the single output port of the multiplexer 15 follows a path determined by the wavelength of the optical signal and reaches an input port corresponding to the wavelength of the optical signal. The optical multiplexer 15 thus operates as a de-multiplexer in this reverse direction.

As described, the FEC circuit 1, PLL circuit 7, amplifier 2, optical modulator 3, wavelength-locked DFB laser 4, VOA 5, path diversity control circuit 6 and PBS 8 form a first-modulation circuit block 100a as shown within the dotted lines and additional first-modulation circuit blocks represented by the dotted enclosure 100n are connected to the other signal input ports 15b, 15c . . . 15n of the optical multiplexer 15. The first-modulation circuit blocks 100a . . . 100n are independent of one another and can be added as needed. The first-modulation circuit blocks are, advantageously, fabricated as circuit boards having an electrical input port and an optical output port capable of connection to a respective optical input port of the multiplexer 15. Additional first-modulation circuit blocks 100n need not occupy consecutive positions in relation to the input ports 15b . . . 15n of the multiplexer 15.

The optical multiplexer/de-multiplexer 15 is preferably an arrayed waveguide (AWG) router which is passive and includes a substantial number, a few hundred, say, of input ports. The AWG router has the intrinsic characteristic that the path taken by light passing through it depends on the wavelength of the light and, as a result the inputs of such a device are wavelength specific. Importantly for the present invention an optical signal applied to the output port of the multiplexer 15 travels to an input port determined by the wavelength of the optical signal. The AWG router may be of glass fabrication.

The FEC circuit 1 includes a plurality of buffer circuits capable of storing (buffering) the input data elements. The stored data elements are delivered to the output port of the FEC circuit 1 under the control of a clock signal applied to the control input port 1b of the FEC circuit 1. The FEC circuit 1 enables incoming data streams data-1 to data-n with phase and frequency drifts around a standard rate, for example, STM-64 or OC-192 data rate, to be converted to a common clock rate. Although the FEC circuit 1 performs both the function of forward error correction and the function of rate conversion, these functions can be separated, forward error correction being performed in a circuit which does not adjust the data rate and rate conversion being performed in a circuit without error-correction capability. The order in which the two functions are performed is immaterial if separate circuits are used.

The apparatus is operable with a fixed power output level from the DFB laser 4 and it thus follows that the VOA 5 is not essential to the apparatus.

The apparatus can include a pulse-shaping modulator alone or a phase modulator alone. Alternatively, an amplitude/phase modulator may be used in place of both the pulse-shaping modulator 13 and the phase modulator 14.

The path diversity circuit 6 is not essential to the apparatus in that it performs a safety function by effecting switching from a main fibre path to another fibre path in the event of a fault condition occurring on the main fibre path. The PBS 8 functions to pass input signals at its first port to its second port acting as an output port and, also, to pass input signals at its second port, acting as an input port, to its third port acting as an output port. The PBS 16 functions in a similar manner to the PBS 8 in passing signals from its first to its second port and, also, from its second port acting as an input port to its third port. The PBS 8, 16 route optical signals in dependence upon there polarisation state.

The 90° rotation in the plane of polarisation of the optical energy in the reverse direction relative to the forward direction, through the PBS 8 and the PBS 16, is required in order to permit the PBS 8 and the PBS 16 to separate the reverse energy from the forward energy.

The PBS 8 and the PBS 16 can be replaced by optical signal circulators in which case the optical feedback path 17 does not need to provide a 90° rotation in the polarisation of the feedback signal from the output of the apparatus.

The operation of the optical transmission apparatus will now be described with reference to a data signal applied to the input port i/p-1. The electrical data signal data-1 arrives at 9.953 Gb/s at the signal input port i/p-1 and receives additional bits for forward error correction in the FEC circuit 1, bringing the data rate to 10.66 Gb/s, under the timing of the control clock oscillator 9 through the feedback connection to the control input port 1b of the FEC circuit 1. This electrical data signal is amplified by the amplifier 2 and the amplified signal is used to control the optical modulator 3. An optical carrier signal, of a selected wavelength $\lambda_1$, is generated by the wavelength-locked DFB laser 4 and the level of the optical carrier signal is adjusted by the VOA 5 before it enters the optical modulator 3 where the optical signal is amplitude-modulated by the 10.66 Gb/s data signal. The modulated optical carrier from the modulator 3 passes to the path diversity control circuit 6 from which it goes to its respective input port 15a of the multiplexer 15 through the PBS 8. The modulated optical carrier travels to the single output port of the multiplexer 15 along an optical path determined by its wavelength as is indicated above.

The optical signal output from the output port of the multiplexer 15 passes through the PBS 16 and the form of the signal is subjected to pulse-shaping in the pulse-shaping modulator 13. The signal leaving the pulse-shaping modulator 13 is next subjected to some form of phase-modulation, for example, modulation effecting frequency chirp to pre-compensate for chromatic dispersion during subsequent transmission of the WDM radiation over the transmission fibre, in the phase modulator 14. The pulse-shaping modulator 13 is synchronised to the clock oscillator 9 through the connection of the control clock oscillator 9, by way of the amplifier 11, to the control port of the pulse-shaping modulator 13. The phase of the signal is adjusted to the phase of the control clock oscillator 9 through the connection of the control clock oscillator 9 to the control port of the phase modulator 14 by way of the frequency doubling circuit 10 and the amplifier 12.

The clock signal for the FEC 1 is recovered from the output signal from the phase modulator 14 by way of a feedback circuit comprising the optical feedback path 17, the PBS 16, the multiplexer 15, the PBS 8 and the PLL 7. Through this clock signal the phase and rate of the FEC 1 is adjusted to synchronise each of the first-modulator circuit blocks to the control clock oscillator 9 and thereby ensure modulation occurs in the centre bit window for each electrical data input signal.

The feedback circuit is an essentially an all optical feedback circuit. The feedback element 17, the PBS 16, the optical multiplexer 15 and the PBS 8 are all optical elements and the feedback circuit is compact in that it requires only the optical feedback element 17 and the PLL 7 as additional components. The PLL 7 of course includes some form of optical to electrical conversion for converting the fed back optical signal to an electrical signal from which the clock signal can be derived The characteristic of the multiplexer/de-multiplexer 15 in separating signals of different wavelengths travelling from its single output port to its input ports 15a . . . 15n avoids the need for separate signal connections (feedback paths) between the PBS 16 and the respective polarisation beam splitters/combiners such as the PBS 8.

The frequency of 5.33 GHz used for the control clock oscillator 9 represents one possible clock frequency for the apparatus. Other clock frequencies may be used and, in general, the clock frequency is so chosen that the pulse-shaping modulator 13 and the phase modulator 14 operate at the line rate which is dictated by the specific arrangement of the system to which the apparatus belongs.

The output optical fibre of the phase modulator 14 includes a tap from which a proportion of the WDM output signal is fed back through the feedback path 17. The 90° rotation of the polarisation introduced by the feedback path permits the use of the PBS 16 and the PBS 8 to distinguish between the forward propagating and fed back signals. The use of polarisation beam splitter (PBS) that route optical signals in dependence upon their polarisation state enables low-loss coupling of the return signal.

The use of the multiplexer 15 as both a multiplexer and a de-multiplexer accommodates the forward and return signals with a minimum of additional components. As is indicated above, the PBS 8 and the PBS 16 may be replaced by optical signal circulators in which case there is no need for the optical feedback path 17 to introduce a 90° rotation of polarisation.

Similarly to the above situation for the signal present at the first signal input port 15a of the multiplexer 15, respective further signals present at the second, third . . . $n^{th}$ signal input ports 15b, 15c . . . 15n of the multiplexer 15 travel through the multiplexer 15 between the input ports and the single output port, both forwards and backwards, along paths determined by their wavelengths.

The feedback path 17 preferably uses an existing fibre patch/back-plane and, consequently, requires no new board-to-board connections.

As is indicated above, the elements 1, 2, 3, 4, 5, 6, 7 and 8 may be provided in a unit containing the first-modulation circuit block for a particular channel and need only be provided when the particular channel in included in the apparatus. These elements may be assembled as a first unit while the remainder of the apparatus is assembled as a second unit. The second unit includes the multiplexer 15, the PBS 16, the pulse-shaping modulator 13, the phase modulator 14, the feedback element 17 and the clocking components 9, 10, 11 and 12, the first and second units being joined to each other by a plurality of optical links corresponding to the input ports of the multiplexer 15.

The optical signal transmission apparatus is especially suitable for transmission including return-to-zero (R-Z) data generation in high-speed dense wavelength division multiplexed (DWDM) networks although, in the present example, the input electrical data signal present at the input port i/p-1 is a non-return-to-zero (NRZ) data signal. The alignment of the phases of the modulator 3 drive signals is effected in order to ensure that modulation occurs in the centre of the bit window for each channel. In the apparatus, the pulse-shaping modulator 13, which is shared by all of the channels, is driven by the fixed control clock oscillator 9 and the data channels are aligned with the pulse-shaping modulator 13 through the optical feedback path to the FEC 1.

In an optical signal transmission apparatus capable of 160-wavelength channel operation (i.e. n=160), an optical modulator 3 is required for each channel. As regards the pulse-shaping modulator 13 and the phase modulator 14, an advantageous arrangement, based on the above apparatus, employs one of each of those modulators for 40 channels, that is, the multiplexer 15 has 40 input ports, resulting in a need for four pulse-shaping modulators and four phase modulators for the full 160 channels.

Known optical signal transmission apparatus capable of equivalent operation to the transmission apparatus of the present invention require a modulator, a pulse-shaping modulator and a phase modulator for each channel, that is, the conventional requirement is for 160 data modulators, 160 pulse-shaping modulators and 160 phase modulators for 160 channel operation. The modulated optical carriers, representing a respective WDM channel, are then multiplexed together to provide the WDM output.

The optical signal transmission apparatus of the present invention is particularly suited to a transmitter in an optical fibre transmission system and a plurality of the transmitters together with interface devices serve the function of a transponder capable of transmitting several times the plurality of data signals.

The invention claimed is:

1. An optical signal transmission apparatus for transmitting a plurality of data signals, comprising:
   a) a plurality of input means for receiving a respective one of the data signals, and for delivering the respective data signal with a controlled phase and at a controlled data rate;
   b) optical carrier generation means for generating a plurality of optical carrier signals having different wavelengths;
   c) a plurality of first modulation means each being operative for modulating a respective one of the optical carriers with a respective data signal to provide a first-modulated optical carrier signal;
   d) an optical signal-routing device having a plurality of input ports, each input port being operative for receiving and delivering a respective one of the first-modulated optical carrier signals to an output port of the device;
   e) further modulation means for further modulating each of the first-modulated optical carrier signals in dependence upon a clock to provide a plurality of further-modulated optical carrier signals; and
   f) a feedback arrangement, including the optical signal-routing device, for feeding back a proportion of each of the further-modulated optical carrier signals to a respective input means for controlling the phase and rate at which the input means delivers the data signal to the first modulation means in dependence upon the further modulation to thereby synchronize each input data signal to the clock, the optical signal-routing device being operative to deliver each of the further-modulated signals applied to the output port to a respective input means along a path which is dependent upon the wavelength of the signal.

2. The apparatus as claimed in claim 1, and further comprising a plurality of first optical directional couplers so connected as to convey the plurality of first-modulated optical carrier signals to the input ports of the optical signal-routing device and to convey the signals conveyed by the feedback arrangement from the input ports of the optical signal-routing device towards the plurality of input means; and a second optical directional coupler so connected as to convey the plurality of first-modulated carrier signals from the output port of the optical signal-routing device and to convey the signals conveyed by the feedback arrangement to the output port of the optical signal-routing device.

3. The apparatus as claimed in claim 2, in which the first and second optical directional couplers are polarization dependent couples that operate as a beam-splitting device in one direction and as a beam-combining device in an opposite direction.

4. The apparatus as claimed in claim 3, and further comprising means, in a feedback path between the further modulation means and the second optical directional coupler, for providing a 90° rotation in the polarization of signals conveyed by the feedback path.

5. The apparatus as claimed in claim 4, in which the feedback path comprises a polarization maintaining optical fiber into which a 90° twist has been introduced.

6. The apparatus as claimed in claim 2, in which the first and second optical directional couplers are optical circulators.

7. The apparatus as claimed in claim 1, in which the optical signal-routing device comprises an arrayed waveguide router.

8. The apparatus as claimed in claim 1, in which the further modulation means comprises a pulse-shaping modulator.

9. The apparatus as claimed in claim 1, in which the further modulation means comprises a phase modulator.

10. The apparatus as claimed in claim 1, in which the further modulation means comprises a pulse-shaping modulator connected in series with a phase modulator.

11. The apparatus as claimed in claim 1, in which the input means includes a buffer store capable of storing input signal data and delivering the signal data at the controlled data rate.

12. A method of transmitting a plurality of data signals, comprising the steps of:
   a) delivering the plurality of data signals with controlled phase at controlled rates;
   b) modulating a plurality of different-wavelength optical carrier signals with the data signals to form first-modulated optical carrier signals;
   c) conveying the plurality of the first-modulated optical carrier signals to respective input ports of an optical signal-routing device;
   d) passing the plurality of the first-modulated optical carrier signals through the optical signal-routing device which delivers the first-modulated optical carrier signals to an output port of the optical signal-routing device along respective paths through the optical signal-routing device dependent on the wavelengths of the optical carrier signals;
   e) subjecting the first-modulated optical carrier signals to further modulation at a set rate to form further-modulated optical carrier signals;
   f) transmitting the further-modulated optical carrier signals following the further modulation; and
   g) controlling the phase and rate of the plurality of the data signals in accordance with the phase and rate of the further modulation.

* * * * *